Aug. 20, 1940.  A. H. PFUND  2,212,211
APPARATUS FOR DETECTING AND MEASURING HETEROATOMIC GASES
Filed Feb. 17, 1938
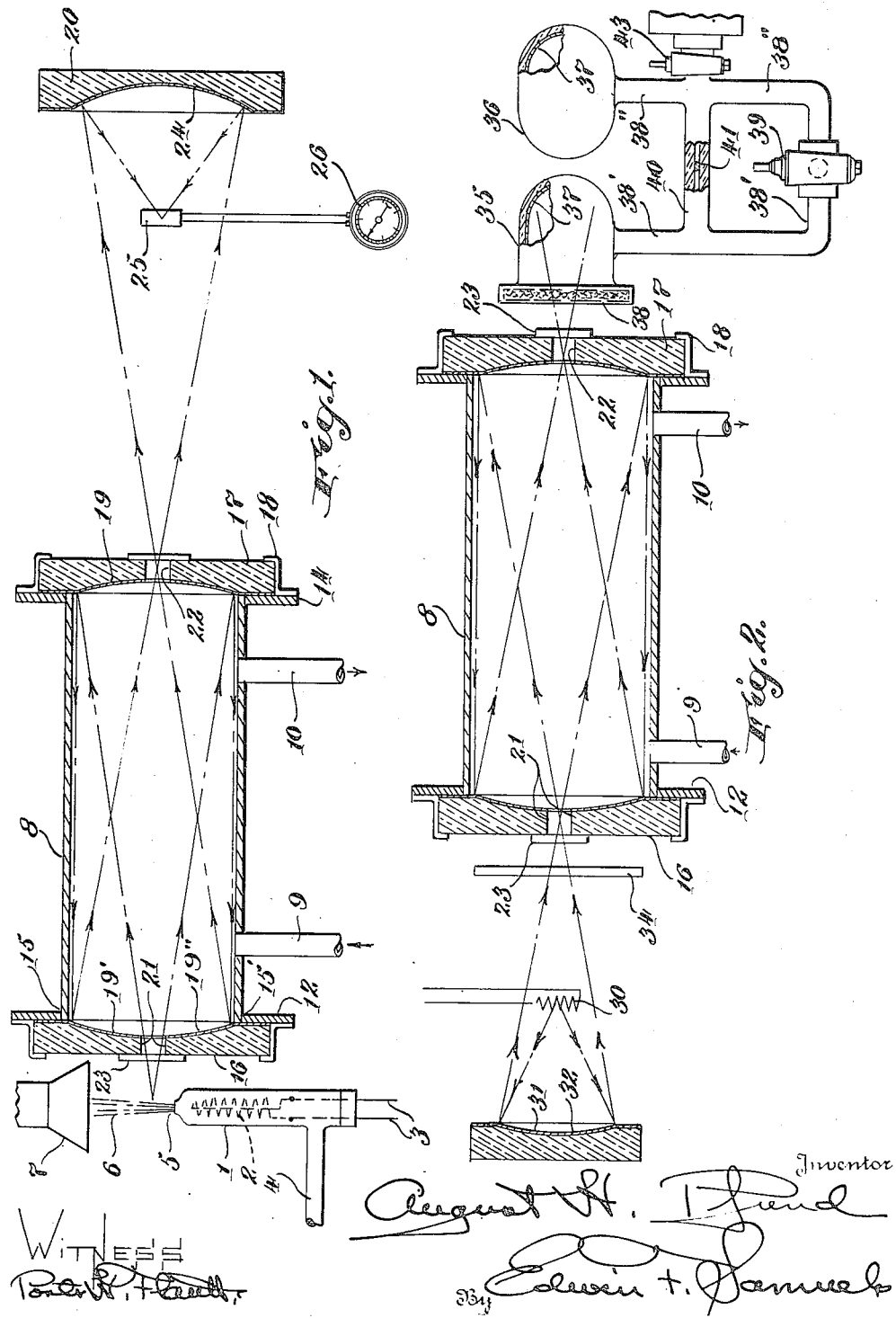

Patented Aug. 20, 1940

2,212,211

UNITED STATES PATENT OFFICE 2,212,211

APPARATUS FOR DETECTING AND MEASURING HETEROATOMIC GASES

August H. Pfund, Baltimore, Md.

Application February 17, 1938, Serial No. 190,931

6 Claims. (Cl. 73—51)

The invention relates to an instrument for detecting the presence of and determining the quantity of any particular identified gas included in a certain class of gaseous substances, so far as that particular gas may be present in the atmosphere or in other gaseous mixtures to be tested by the instrument or method of the invention.

The detection and measuring operation are dependent on the fact that gases composed of heteroatomic molecules, as distinguished from those composed of homoatomic molecules, at low temperatures have the ability to absorb rays of substantially a single wave length. It is also important in one form of the invention that when heated these gases give off rays of the same wave length which they absorb.

The term "heteroatomic" is here used to indicate a gas the molecules of which include two or more kinds of atoms, as $CO_2$, $H_2S$, $HCN$, and $H_2O$. "Homoatomic" is used to indicate a gas the molecules of which contain only one kind of atom as $O_2$ or $N_2$.

By utilizing this known principle in accordance with the invention, it is possible, for example, to detect the presence of and measure the quantities of carbon monoxide, fire damp, ether, and other noxious gases in the atmosphere; and/or determine the amount of carbon dioxide in the atmosphere; to determine the presence of and measure the quantities of certain gases such as carbon monoxide and carbon dioxide in illuminating gas; and also to detect the presence in the atmosphere and likewise measure the proportions of the poisonous gases used for military purposes.

Examples of gases which can be detected, and measured, as to the proportions present in any gas tested, according to the invention, are carbon monoxide, carbon dioxide, methane and other heteroatomic gases. It is well known that heteroatomic gases absorb radiations in narrow bands indicative of wave length, and occupy a known position in the spectrum, which is characteristic of each particular gas. The wave lengths of the absorption bands of carbon dioxide are not coincident with those of carbon monoxide, methane, water vapor, etc. The intensity of the total infra-red emission from an incandescent solid would be slightly affected by passing through air containing $CO_2$, but the result is not sufficiently emphasized for testing purposes.

In the practice of the invention, an essential feature is a source of rays of the wave length absorbed by the gas to be detected. This may be a device for generating waves of a single predetermined length, or a device for generating the waves of various different lengths, including the length required, together with means for limiting the rays transmitted to those of a single pre-determined length.

In the preferred form I employ, as a source of radiation, a jet at a radiating temperature of the gas, the presence of which in the atmosphere is to be detected; i. e., if air is to be tested for the presence and proportion of carbon monoxide therein, a jet of carbon monoxide is used as a source of radiation. This source will emit radiations whose wave lengths are essentially the same as the length of the rays absorbed by the cold gas. It is by application of this principle that the detection of the presence, and determination of the proportions of gases in the air and other mixtures is accomplished in the practice of the invention.

In accordance with another form of the invention, I use as a source an incandescent solid or other source of multiple wave lengths including waves of the length absorbed by the gas to be detected and a light filter, or equivalent device is used to separate the waves of the length to be detected from the other waves. According to a third form of the invention, the source of radiation of the wave length absorption by the gas to be detected may be a flame containing the said gas. This is particularly adapted to detecting and measuring the proportion of carbon dioxide in a gas sample. An illuminating gas flame may be used, and any other combustible hydrocarbon flame may be used for this purpose, i. e., as a source. This is of importance in testing flue gases in combustion engineering work.

The gas sample to be tested for the presence and quantity of the said gas to be detected is circulated through a container suitably arranged for this purpose, and the rays of the length absorbed by the gas to be detected are passed through the container and thereafter focussed or directed upon an instrument adapted to measure radiant energy, such as a thermo pile, bolometer, the bulb of an air thermometer or other thermometer, or a thermometer having as the sensitive element the gas to be detected and measured.

By taking the readings of the measuring instrument first as to the rays after passing through a gas sample which is free of the gas to be detected and then after passing through a sample of the gas to be tested, a decrease of radiant effect is obtained which is in correspondence with the proportions in which the gas for which the test is being made, i. e., the gas to be detected is present in the sample being tested. The desired data may be obtained in this way, as suitable calibration of the measuring instrument, i. e., thermometer or the like makes it possible to read these proportions directly therefrom.

In the accompanying drawing, I have shown diagrammatically two forms of apparatus which are illustrative of two ways in which the invention may be applied.

In the drawing:

Figure 1 is a diagrammatic section on the axis of the apparatus, of the preferred form.

Figure 2 is a similar section of a modified form of the apparatus.

Referring to the drawing by numerals, each of which is used to indicate the same, or similar parts in the different figures, the apparatus (Fig. 1) comprises a tube 1 which is preferably of Pyrex glass. In the form illustrated, this tube is arranged with its axis vertically disposed, and contains an electric heating unit 2 which may be of nichrome wire, and in the usual spiral form, attached to suitable conductors 3. The gas to be employed as a source of radiation is introduced through a feed passage 4. The tube 1 has a constricted opening at the top at 5 to emit a jet 6 which is controlled by the constriction of the discharge opening 5 so that it will not be deflected by air currents. The preferred temperatures are from 300° to 1000° centigrade, and, although the jet is non-luminous at these temperatures, intense infra-red radiations are given off. A hood 7, or any suitable means, may be provided to conduct the gas from the jet to a suitable point of discharge.

The apparatus also includes an absorption chamber shown in the form of a metal tube 8 arranged with its axis intersecting the jet 6 near the point of discharge. This tube, in accordance with the preferred proportions of the apparatus, as constructed and operated, is about 30 cm. in length and 6.5 cm. in diameter. The gas to be tested is introduced and discharged by way of the connections 9 and 10 respectively. The tube 8, as shown, is provided with square end plates 12 and 14 which, in the apparatus as constructed, are sweated to the ends of the tube being centrally apertured at 15 to enclose the same—the sweating being indicated by reference character 15'. These end plates provide supports for the mirrors 16 and 17 at the respective ends of the absorption chamber; the same being attached to these plates in any suitable manner, as by means of hooks, or cleats 18.

The mirrors have their concave reflecting surfaces 19, 19' disposed inwardly toward the chamber and formed with their axes coincident with the axis of the chamber, though the exact contour of the outside wall of the chamber is not material. The radius of curvature in the form shown is equal to twice the length of the tube, or chamber 8—in this case 60 cm.—and the reflecting medium 10" consists of a coating, or covering, in the form of a highly reflecting film. Pure gold, or platinum, or any material adapted to form a reflecting surface, and resistant to attack by fumes, is satisfactory for this purpose.

The mirrors 16 and 17 are each apertured concentrically with the axis, the apertures 21 and 22 as shown, being 15 mm. in diameter, and these openings are covered with a material easily permeable by infra-red rays, such as rock salt, fluorite, or the like. Discs of this material are indicated at 23.

In operation, the radiations from the jet 6 entering the aperture 21 are reflected from the concave surface 19 of the mirror 17, and rendered parallel by this reflection. They then contact the reflecting surface 19" of the mirror 16, which focuses the radiation in the aperture 22 through which the rays pass out of the absorption chamber. This means that the radiation has traversed the length of the absorption chamber three times.

The apparatus also includes a concave mirror 20 which may have a reflecting surface 24 similar to that already described in connection with the mirrors 16 and 17 or any suitable reflecting surface. This mirror, as shown, is arranged coaxially with the mirrors 16 and 17, and spaced from the mirror 17 at a length substantially equal to the distance of the chamber 8, though this arrangement is capable of variation—the object being to focus the rays on a thermopile, bolometer or any device 25, sensitive to temperature changes, and adapted to indicate the same. A dial for this instrument, being shown diagrammatically at 26. In actual operation, a single junction vacuum thermopile, connected to a sensitive galvanometer was used.

In the testing operation, the jet 6 being formed by discharging the gas to be detected, as $CO_2$, from the tube 1 the same being heated by the heat unit 2 forming a radiant jet 6.

$CO_2$ being referred to as a convenient example of a heteroatomic gas to study the $CO_2$ content of ordinary air, alveolar air, or illuminating gas, the absorption chamber 8 is flushed with air previously freed from $CO_2$ as by the use of KOH and soda lime. The intensity of the radiation from jet 6 traversing the absorption chamber is recorded, being proportionate to the deflection of the galvanometer, or other indicating instrument at 26. Next, the absorption chamber is filled with the gas to be tested for $CO_2$ as, for example, alveolar air. This is known to contain 5% $CO_2$, 6% water, etc. The presence of the water vapor does not affect the radiations from the jet 6, but the $CO_2$ (carbon dioxide) has a definite effect on these radiations. It absorbs over 80% of the incident $CO_2$ radiation, thus bringing about a large decrease of the galvanometer deflection.

With this, or similar apparatus, concentrations of $\frac{1}{1000}$ of 1% or less of $CO_2$ in air can be detected and measured, and other heteroatomic gases can be detected, and their proportions in the gas mixture tested, can be ascertained in the same way.

Tests, with illuminating gas, such as that taken from the mains of the city of Baltimore, show that radiations from a hot jet of this gas previously freed from $CO_2$ are not absorbed by alveolar air, but are strongly absorbed by illuminating gas freed from $CO_2$ with which the absorption chamber 8 is filled.

According to another form of the invention for some purposes, mainly detecting and measuring proportions of $CO_2$, the source 6 of radiation in Figure 1 may be a flame containing the gas to be detected the same being at a radiating temperature. This is particularly adapted to testing the presence and proportions of gases which are products of combustion as $CO_2$, etc. as in testing flue gases and the like in combustion engineering work. The remainder of the apparatus and the method of operation may be as shown in Figure 1 and as described above. The top of such a flame properly controlled would be substantially pure $CO_2$ and water which latter may be separated by known methods.

Figure 2 shows diagrammatically another form of the apparatus.

This includes a source 30 of infra-red rays in the form of a red hot solid for which a Nichrone heating element may be employed. The absorption chamber 8 and the mirrors 16 and 17 at each end of the same and also the discs 23 may be identical with the corresponding elements in Figure 1. The source 30 is placed in line with the axis of the chamber 8 and may be spaced from the same substantially in the proportions illustrated. The rays from the source 30 fall on a mirror 31 having a suitable concave reflecting surface 32 by which the rays are focused, or substantially focused, and passed through the opening 21 of the mirror 16, the mirror 31 being preferably arranged with its axis in line with the axes of mirrors 16 and 17.

A filter 34 is shown as interposed between the source 31 and the opening 21 in mirror 16 for the purpose of limiting the range of wave lengths entering this opening, the rays being in this way limited to those of suitable wave lengths for absorption by the gas in the chamber 8 of this apparatus; it being understood that the filters 34 supported in any suitable manner, not shown, are to be changed so as to limit the rays passed through the opening 21 to rays of substantially the same wave length as those absorbed by the gas, the presence of which is to be detected.

This type of filter is well known—the term "filter" being applied to any device other than a spectroscope which will isolate relatively narrow spectral regions. While the filter is not absolutely necessary, the effect which it produces is desirable.

The apparatus (Fig. 2) also includes a device which may be referred to as like an air thermometer in construction. It consists, in the form shown, of two glass bulbs 35 and 36 preferably of equal volume. In the form shown, both are coated with a heavy layer of silver 37 on the inside. The bulb 35 is provided with a window 38 of rock salt, or the equivalent, adjacent and disposed toward the opening 22 in the mirror 17 of Figure 2; the bulb 35 being arranged with the silver surface 37 in line with the rays from the opening 22. The bulbs 35 and 36 are connected by tubes 38' and 38'' to a stop cock 39 which, when opened, permits the gases to pass from one bulb to the other, and to assume an equal pressure in both bulbs.

There is also a capillary tube 40 in parallel with the stop cock, containing a short column of light oil 41. An example of the operation of this apparatus on any heteroatomic gas, $CO_2$ being referred to for convenience, is as follows: in the operation of the invention, the bulbs 35 and 36 are filled with the pure gas, $CO_2$, admitted at atmospheric pressure through an admission cock 43. During this operation, the stop cock 39 is opened so that bulbs 35 and 36 are in communication. After the cock 43 has been closed, the apparatus is ready for use in the measurement and detection of $CO_2$. The stop cock 39 being closed, cuts off communication between the bulbs 35 and 36 so that the $CO_2$ in the bulb 35 upon being heated and expanded by the incident radiation, will force the oil column 41 to the right. The motion of this column is observed by means of a low-powered miscroscope, not shown, supplied with a filar miscroscopic eye-piece for purposes of measurement. The absorption chamber 8 being filled with air, which is free of $CO_2$, and the rays from the source 30 being passed there through a filter 34 which is suitable to the passage of the rays emitted and absorbed by $CO_2$ being used, the position of the column 41 is noted. Next, the chamber 8 is filled with a suitable sample of air containing $CO_2$, as alveolar air. The $CO_2$ in the exhaled air absorbs some of the radiation which previously had heated up the pure gas in the bulb 35. As the result, the temperature of bulb 35 falls and the oil column 41 moves to the left. By ascertaining the extent of the change of position of the oil column 41 which may be readable in terms of the quantity of $CO_2$ present in the sample contained in the chamber 8; the proportions of $CO_2$ in this sample are ascertained.

There are well known devices other than oil column 41 and bulb 36 for measuring the change in temperature or pressure in bulb 35 which will indicate the results of this test more accurately, the air thermometer being selected as convenient for illustration the bulb 35 to contain a body or quantity of the gas to be detected with any means for measuring the heating effect on this body of gas, of the rays passed through the sample of the gas to be examined being the important feature of the measuring element 35 to 43.

My preferred and modified forms of apparatus for detecting the presence of gases, more particularly heteroatomic gases in mixtures of other gases, or in air, and for ascertaining the proportions in which these gases are present have thus been disclosed, the details being capable of wide variation within the scope of the invention, and while the description is specific and in detail in order that the manner of constructing, applying, operating and using the invention, may be fully understood, the specific terms are herein used descriptively rather than in a limited sense, the scope of the invention being defined in the claims.

What I claim as new and desire to secure by Letters Patent is:

1. An apparatus for detecting the presence of an identified heteroatomic gas in a gas sample to be tested, which comprises a source of infra-red rays of the wave length of the rays absorbed by the gas to be detected; an absorption chamber adapted to contain a sample of the gas to be tested, opposed concave mirrors, said chamber being between said mirrors, the source being adjacent the first mirror, which is apertured to admit said rays, and substantially at the focus of the second mirror, which is apertured substantially in line with, and close to, the focus of the first mirror to release the rays, and means for ascertaining the extent of absorption of said rays by the sample in the absorption chamber, the source of radiations and the means for determining the extent of the absorption of said rays being located outside of and adjacent the opposite ends of the absorption chamber.

2. An apparatus for detecting the presence of an identified heteroatomic gas in a gas sample to be tested, which comprises a source of infra-red rays of the wave length of the rays absorbed by the gas to be detected, and an absorption chamber adapted to contain a sample of the gas to be tested, opposed concave mirrors, the focus of each being near the center of the other, said chamber being between said mirrors—the said source being substantially in alignment with the axis of one mirror, which is apertured near the focus of the other mirror to release the rays, the other mirror being apertured to admit the rays, and means for ascertaining the extent of the absorption of said rays by the sample to be tested in the absorption chamber, the source of radiations and the means for determining the extent of the absorption of said rays being located outside of and adjacent the opposite ends of the absorption chamber.

3. An apparatus for detecting the presence of an identified heteroatomic gas in a gas sample to be tested, which comprises a source of infra-red rays of the wave length of the rays absorbed by the gas to be detected, an absorption chamber adapted to contain a sample of the gas to be tested, opposed concave mirrors, the focus of each being near the center of the other, said chamber being between said mirrors—the said source being substantially in alignment with the axis of one mirror, which is apertured near the focus of the other mirror to release the rays, the other mirror being apertured to admit the rays, and means for ascertaining the extent of the absorption of said rays by the sample to be tested in the absorption chamber, the source of said radiations being a portion of the gas to be detected, heated to a radiating temperature, the source of radiations and the means for determining the extent of the absorption of said rays being located outside of and adjacent the opposite ends of the absorption chamber.

4. An apparatus for detecting the percentage present of heteroatomic gas, comprising a source of infra-red radiations, a closed detector chamber disposed to receive radiations from said source, said chamber including a window, and being filled with a gas of the same type as that under test, means associated with said detector chamber for indicating any change in temperature due to absorption of said rays, and a specimen absorption chamber interposed between the source of radiation and said detector chamber, said specimen chamber having aligned windows for passage of said infra-red rays and adapted to receive a sample of gas for analysis.

5. In an apparatus for determining the percentage of a known heteroatomic gas in a mixture of gases, comprising a source of infra-red radiations, a detector chamber having a window for admitting said radiations, said detector chamber containing a quantity of heteroatomic gas of the kind for which the test is made, and being disposed to absorb said radiations through said window, a second chamber interposed between said source of radiations and said detector chamber, the second chamber being adapted to receive a specimen of the gas mixture to be tested, said second chamber having windows therein aligned for passage of the infra-red radiations through the second chamber to the window of the detector chamber, and means for registering the absorption of the radiations by the gas in the said detector chamber before and after the radiations have passed through the said second chamber.

6. In an apparatus for detecting the presence of a heteroatomic gas in a mixture of gases, comprising a source of infra-red radiations, a detector chamber having a window for admitting said radiations, said detector chamber containing a quantity of the heteroatomic gas of the kind for which the test is made, and being disposed to receive radiations through said window, a second chamber interposed between said source of radiations and said detector chamber, the second chamber being adapted to receive a specimen of the gas mixture to be tested, said second chamber having windows therein aligned for passage of the infra-red radiations through the second chamber to the detector chamber and means associated with said detector chamber for indicating changes in temperature of the gas therein due to the absorption of the said infra-red radiations by the gas in the said detector chamber.

AUGUST H. PFUND.